United States Patent [19]

Yamada et al.

[11] Patent Number: 5,216,067
[45] Date of Patent: Jun. 1, 1993

[54] FLUORORESIN COATING COMPOSITION

[75] Inventors: Katsuya Yamada; Masaya Nishi; Yoshichika Nishimura, all of Osaka, Japan

[73] Assignee: Sumitomo Electric Industries, Ltd., Osaka, Japan

[21] Appl. No.: 779,902

[22] Filed: Oct. 21, 1991

[30] Foreign Application Priority Data

Oct. 30, 1990 [JP] Japan ................... 2-294664

[51] Int. Cl.$^5$ ................. C08L 27/18; C08L 27/12
[52] U.S. Cl. ................... 524/520; 524/199; 524/200
[58] Field of Search ............ 525/200, 199; 524/520

[56] References Cited

U.S. PATENT DOCUMENTS

| | | | |
|---|---|---|---|
| 4,252,859 | 2/1981 | Concannon et al. | 525/200 |
| 4,400,487 | 8/1983 | Stoneberg et al. | 525/199 |
| 4,914,158 | 4/1990 | Yoshimura et al. | 525/200 |

FOREIGN PATENT DOCUMENTS

| | | | |
|---|---|---|---|
| 2840356 | 4/1980 | Fed. Rep. of Germany | 525/200 |
| 53-139661 | 12/1978 | Japan | 525/200 |
| 61-047765 | 3/1986 | Japan | 525/200 |

Primary Examiner—Carman J. Seccuro, Jr.
Attorney, Agent, or Firm—Sughrue, Mion, Zinn, Macpeak & Seas

[57] ABSTRACT

A fluororesin coating composition comprising a liquid medium having dispersed therein (A) fluororesin particles having an average particle diameter of 5 μm or more and (B) fluororesin particles having an average particle diameter of 1 μm or less. In the coating composition, the proportion of the fluororesin particles (B) based on the total amount of the fluororesin particles (A) and (B) being from 20 to 80% by weight. The fluororesin coating composition is excellent in both film-forming properties and stability.

13 Claims, 2 Drawing Sheets

FLUORORESIN COATING COMPOSITION

FIELD OF THE INVENTION

The present invention relates to a fluororesin coating composition for use in manufacturing fluororesin-coated articles. Particularly, it relates to a fluororesin coating composition excellent in both film-forming properties and stability.

BACKGROUND OF THE INVENTION

Conventional fluororesin coating compositions are dispersions obtained by dispersing fluororesin particles having an average particle diameter of 1 μm or less into a liquid medium such as water with the aid of a surfactant (as described, for example, in JP-A-60-252381), and coating films having few defects have rarely been obtained therefrom because of the low interparticle cohesive force of the fluororesin particles. (The term "JP-A" as used herein means an "unexamined published Japanese patent application".) In particular, if the coating compositions are applied thickly so as to form coating films with thicknesses exceeding 20 to 30 μm by a single coating operation, the result has often been that cracks are developed in the thus-formed coating films or the coating composition applied on substrates suffer cissing on the substrate surfaces to cause depression defects.

It has, therefore, been necessary that the coating operation be repeatedly conducted in order to obtain a large-thickness coating film.

In contrast, powdered fluororesins for use in electrostatic coating, which have average particle diameters as large as 5 μm or more (as described, for example, in JP-B-62-10429), have been able to form defect-free coating films as thick as 50 to 80 μm even through a single coating operation because their interparticle cohesive force is high particularly where the particles are spherical. (The term "JP-B" as used herein means an "examined Japanese patent publication".)

However, electrostatic coating with fluororesin powders has been defective in that control of film thickness is difficult and coating films uniform in thickness are difficult to obtain.

As described above, it has been difficult for the conventional fluororesin coating compositions to give coating films having few defects and, further, it has been difficult for the powdered fluororesins for use in electrostatic coating to give coating films having uniform thicknesses.

SUMMARY OF THE INVENTION

The present invention has been completed in order to eliminate the above problems.

Accordingly, an object of the present invention is to provide a fluororesin coating composition that is excellent in both film-forming properties and stability and is useful in the manufacture of fluororesin-coated articles.

Other objects and effects of the present invention will be apparent from the following description.

The present invention provides a fluororesin coating composition comprising a liquid medium having dispersed therein (A) fluororesin particles having an average particle diameter of 5 μm or more and (B) fluororesin particles having an average particle diameter of 1 μm or less, the proportion of the fluororesin particles (B) based on the total amount of the fluororesin particles (A) and (B) being from 20 to 80% by weight.

Preferred embodiments of the present invention include:

(1) The above fluororesin coating composition in that the fluororesin particles (A) and (B) are spherical particles of a tetrafluoroethylene-perfluoro(alkyl vinyl ether) copolymer (PFA); and (2) The above fluororesin coating composition in that the liquid medium comprises water and a nonionic surfactant.

DETAILED DESCRIPTION OF THE INVENTION

The present inventors have found that by dispersing a powdered fluororesin for use in electrostatic coating into a liquid medium, a wet fluororesin coating composition can be obtained which has a high degree of film-forming properties, i.e., the ability to form a defect-free coating film even through single coating at a large thickness, and the coating of which can be easily controlled so as to result in an arbitrary coating film thickness in the range of from several micrometers (μm) to several tens of micrometers.

Although such fluororesin particles for use in electrostatic coating have a high degree of film-forming properties because of their strong interparticle cohesive force, the wet coating composition obtained by dispersing the fluororesin particles into a liquid medium has had a problem that the particles settle within a very short period of time due to the strong interparticle cohesive force and suffer from irreversible agglomeration that cannot be easily redispersed by a simple means such as stirring.

The present inventors have made further intensive studies in order to overcome the above-described problem. As a result, it has been found that a fluororesin coating composition which is excellent in film-forming property and in the property of being easily regulated to give a desired coating film thickness and is free from irreversible agglomeration (i.e., able to be easily redispersed by a simple means such as stirring) and which therefore is industrially utilizable advantageously can be obtained by dispersing (A) fluororesin particles having an average particle diameter of 5 μm or more and (B) fluororesin particles having an average particle diameter of 1 μm or less into a liquid medium in such amounts that the proportion of component (B) as defined by the formula:

Proportion of Component $(B) = (B)/((A)+(B))$ is 20% by weight or more and 80% by weight or less. The present invention has been completed based on this finding.

Figure 1:
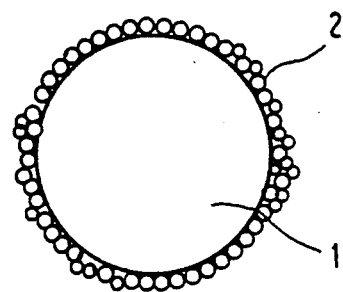
FIG. 1 is a schematic sectional view of a composite particle contained in one embodiment of the present invention.
Figure 2:
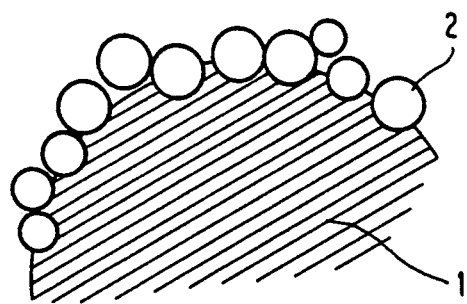
FIG. 2 is an enlarged schematic view illustrating part of a section of a composite particle contained in another embodiment of the present invention.

In FIGS. 1 and 2, which each schematically illustrates fluororesin particles contained in one embodiment of the present invention, numeral 1 denotes a fluororesin particle for use in electrostatic coating which particle shows strong interparticle cohesive force and 2 denotes fluororesin particles for use in conventional fluororesin coating compositions which particles have weak interparticle cohesive force and excellent dispersibility.

Particles (1) have extremely good film-forming properties, but dispersions thereof in liquid media are apt to form irreversible agglomerates of particles (1). Therefore, by surrounding each of such particles (1) with particles (2) poor in film-forming property but excellent in dispersibility, fluororesin composite particles which are less apt to suffer irreversible agglomeration and have excellent stability can be obtained while maintaining good film-forming properties. Moreover, since such composite particles have been formulated into a wet coating composition, it can be easily applied to form coating films having arbitrary film thicknesses in the range of from several micrometers to several tens of micrometers.

Examples of the fluororesin constituting fluororesin particles (A) having an average particle diameter of 5 μm or more which are contained in the fluororesin coating composition of the present invention include PTFE (polytetrafluoroethylene), PFA (tetrafluoroethylene-perfluoro(alkyl vinyl ether) copolymers), FEP (tetrafluoroethylene-hexafluoropropylene copolymers), ETFE (tetrafluoroethylene-ethylene copolymers), CTFE (polychlorotrifluoroethylene), PVdF (poly(vinylidene fluoride)), and copolymers thereof. Of these, PFA, FEP, ETFE, CTFE, and copolymers thereof are preferably used since such polymers have excellent film-forming properties.

The average particle diameter of fluororesin particles (A) is not particularly limited as long as it is 5 μm or more. Preferably, however, the average particle diameter thereof is from 10 to 30 μm because particle diameters in this range bring about excellent film-forming properties.

It is particularly preferred that the shape of fluororesin particles (A) be spherical because such particles have further improved film-forming properties.

Examples of the fluororesin constituting fluororesin particles (B) having an average particle diameter of 1 μm or less which are contained in the fluororesin coating composition of the present invention also include PTFE, PFA, FEP, ETFE, CTFE, PVdF, and copolymers thereof, with PFA, FEP, ETFE, CTFE, and copolymers thereof being preferably used. The average particle diameter of fluororesin particles (B) is not particularly limited as long as it is 1 μm or less. However, fluororesin particles having an average particle diameter of 0.5 μm or less are preferably used as component (B) because they have an excellent agglomeration-preventive effect.

The shape of fluororesin particles (B) is preferably spherical because such particles are good in the property of forming composite particles together with fluororesin particles (A) and impart good film-forming properties to the resulting coating composition.

The relative amounts of components (A) and (B) are not particularly limited, and component (B) may be incorporated in such an amount that the film-forming properties of component (A) are not significantly impaired and the irreversible agglomeration of component (A) can be prevented. In general, however, the preferred range of the proportion of component (B) based on the total weight of component (A) and (B) as defined by the formula:

Proportion of Component $(B) = (B)/((A) + (B))$ is from 20 to 80% by weight, because irreversible agglomeration can be prevented when the proportion of component (B) is 20% by weight or more, while the film-forming properties of component (A) are not greatly impaired when the proportion of component (B) is 80% by weight or less. It is particularly preferred that the proportion of component (B) be 25% by weight or more from the standpoint of imparting good stability to the coating composition and 45% by weight or less from the standpoint of attaining excellent film-forming properties.

Examples of the liquid medium include water, polar organic solvents, nonpolar organic solvents, and mixtures thereof. Of these, water is particularly preferably used from the standpoint of easy handling and the prevention of environmental pollution.

As a dispersing agent for use in the liquid medium, a surfactant may preferably be employed. Preferred examples of the surfactant include anionic surfactants and nonionic surfactants, and such surfactants may be used alone or in combination of two or more thereof. Particularly preferred of these are nonionic surfactants.

The amount of the surfactant is generally from 1 to 20 wt %, preferably from 3 to 10 wt %, based on the amount of the coating composition.

Examples of the anionic surfactant include soap (e.g., sodium laurate, sodium stearate, sodium oleate), sulfate salts (e.g., sodium lauryl alcohol sulfate, sodium lauryl ether sulfate), sulfonate salts (e.g., sodium dodecyl-benzene sulfonate, α-olefin sulfonate salts), phosphate salts, and dithiophosphate salts. Examples of the nonionic surfactant include alkylphenol ethylene oxide adducts (e.g., polyoxyethylene octyl phenyl ether, polyoxyethylene nonyl phenyl ether, polyoxyethylene dodecyl phenyl ether), higher alcohol ethylene oxide adducts, fatty acid ethylene oxide adducts, and fluorine surfactants.

Figure 3:
FIG. 3 is a photograph, which is a scanning electron photomicrograph (×2,400) of composite particles contained in a further embodiment of the present invention.
Figure 4:
FIG. 4 is a photograph, which is a scanning electron photomicrograph (×2,400) of a sliced piece cut out of a PFA particle agglomerate formed in a comparative coating composition.

It has been ascertained from electron microscopy as shown in FIG. 3 that the two kinds of fluororesin particles contained in the coating composition of the present invention are in the form of composite particles as illustrated in the schematic views shown in FIGS. 1 and 2. Accordingly, it is considered that the most characteristic feature of the fluororesin coating composition of the present invention resides in that the fluororesin particles dispersed in the liquid medium are in such a composite particle form, and good film-forming properties and dispersion stability have been brought about due to such a specific configuration of the fluororesin particles.

Production methods for the fluororesin coating composition are not particularly limited, and examples thereof include:

(1) Particles (A) are dispersed in a liquid medium and particles (B) in powder form are then added thereto and mixed;

(2) Particles (A) are dispersed in a liquid medium and a dispersion of particles (B) which has been prepared beforehand by dispersing particles (B) in a liquid medium is then added thereto and mixed;

(3) Particles (B) are dispersed in a liquid medium and particles (A) in powder form are then added thereto and mixed; and (4) Particles (A) and particles (B) both in powder form are mixed together and then dispersed in a liquid medium.

The configuration of each of the composite particles is not particularly limited. For example, particles (B) may be adsorbed on the surface of particle (A) simply by means of van der Waals force or through a surfactant, as shown in the schematic view of FIG. 1 and the photograph of FIG. 3. Alternatively, particles (B) may be tenaciously fixed on the surface of particle (A) by partly inserting the particles (B) into the particle (A) surface as shown in FIG. 2.

Into the fluororesin coating composition of the present invention, coloring pigments such as carbon, titanium white, mica, titanium oxide, colored mica coated with iron oxide, etc., and other inorganic pigments may be incorporated. The amount of the pigment is generally from 1 to 60 wt %, preferably from 2 to 25 wt %, based on the solid content of the coating composition.

Further, various kinds of adhesives such as engineering plastics including PAI (polyamideimides), PI (polyimides), and PES (polyethersulfones), organic metal complexes, and the like may also be added for improving adhesion to metals, ceramics, glasses, and the like. The amount of the adhesive is generally from 0.5 to 50 wt %, from 1 to 25 wt %, based on the solid content of the coating composition.

In the case where a nonaqueous solvent is used as the liquid medium, a silane coupling agent or the like may be used as an adhesion improver. The amount of the adhesion improver is generally from 0.1 to 20 parts by weight, preferably from 0.5 to 10 parts by weight, per 100 parts by weight of the solid content of the coating composition.

The present invention will be explained below in more detail by reference to the following Examples, but the invention is not construed as being limited thereto.

EXAMPLE 1

329 g of a PFA powder ("MP-102", manufactured by du Pont) composed of PFA spherical particles having an average particle diameter of about 20 $\mu$m was dispersed into a liquid medium prepared by mixing 309 g of water and 62 g of a surfactant ("Octapol 80", polyoxyethylene octyl phenyl ether manufactured by Sanyo Chemical Industries, Ltd., Japan). To this dispersion was added 300 g of a PFA dispersion ("AD-2-CR", manufactured by Daikin Industries, Ltd., Japan) composed of 47 wt % PFA spherical particles having an average particle diameter of 0.4 $\mu$m, 6 wt % surfactant, and 47 wt % water. The resulting mixture was sufficiently stirred to prepare a fluororesin coating composition.

The coating composition thus obtained was allowed to stand for a week. As a result, it had separated into a supernatant and a milky part, but the particles were easily redispersed by simply turning the container of the composition upside down. Thus, the coating composition prepared above was found to be stable.

EXAMPLES 2 TO 4 AND COMPARATIVE EXAMPLE 1

The surface of an aluminum roller having an outer of 30 mm and a wall thickness of 2 mm was finished by cutting so as to have a surface roughness of 2 $\mu$m. After the roughened surface was cleaned, a primer ("Tough Coat TCW-8808", manufactured by Daikin Industries, Ltd.) was coated thereon at a thickness of about 10 $\mu$m. When the primer coating became in a semidry state, each of the coating compositions as shown in Table 1 was applied thereon. The resulting coating was dried at 250° C. for 10 minutes and then baked at 390° C. for 30 minutes, thereby obtaining a PFA-coated fixing roller for copying machines.

As Table 1 shows, the coating composition prepared in Example 1 was able to give defect-free coating films having thicknesses of from 30 to 50 'm.

In contrast, the coating film formed from AD-2-CR developed depression defects at a thickness of 30 $\mu$m and, hence, was found to be unsuited for large-thickness coating.

TABLE 1

| Sample | Coating composition | Coating thickness ($\mu$m) | Surface state (defects) |
|---|---|---|---|
| Comparative Example 1 | AD-2-CR | 30 | depression defects |
| Example 2 | Composition of Example 1 | 30 | no defects |
| Example 3 | Composition of Example 1 | 40 | no defects |
| Example 4 | Composition of Example 1 | 50 | no defects |

EXAMPLE 5

329 g of a PFA powder ("MP-102", manufactured by du Pont) composed of PFA spherical particles having an average particle diameter of about 20 $\mu$m was dispersed into a liquid medium prepared by mixing 339 g of water and 32 g of a surfactant "Octapol 80", manufactured by Sanyo Chemical Industries, Ltd.). To this dispersion was added 300 g of a PFA dispersion ("AD-2-CR", manufactured by Daikin Industries, Ltd.) composed of 47 wt % PFA spherical particles having an average particle diameter of 0.4 $\mu$m, 6 wt % surfactant, and 47 wt % water. The resulting mixture was sufficiently stirred to prepare a fluororesin coating composition.

The coating composition thus obtained was allowed to stand for a week. As a result, it had separated into a supernatant and a milky part, but the particles were easily redispersed by simply turning the container of the composition upside down. Thus, the coating composition prepared above was found to be stable.

EXAMPLES 6 AND 7 AND COMPARATIVE EXAMPLES 2 AND 3

Using an aluminum plate having a thickness of 2.5 mm ("ASB", manufactured by Kobe Steel, Ltd., Japan) as an anode, electrochemical etching treatment of the aluminum plate was conducted in an aqueous solution of ammonium, chloride at an electrical quantity of 25 C/cm² to finely roughen the surface of the plate.

Each of the coating compositions as shown in Table 2 was coated on the roughened aluminum plate surface, dried to remove the water, and then baked at 390° C. for 30 minutes. The thus-obtained coated aluminum plates were evaluated for surface state and corrosion resistance, and the results obtained are shown in Table 2. It is seen from the results that the aluminum plates coated with the coating composition prepared in Example 5 had excellent corrosion resistance.

The corrosion resistance evaluation was conducted according to the following method.

Corrosion Resistance Evaluation Method

In 1 liter of water was dissolved 25 g of "Japanese Hotchpotch Stock" (manufactured by House Shokuhin Kogyo K. K., Japan). Test pieces were then immersed in the above solution and heated therein at 90° to 100° C. While the test pieces were kept in this state, the time required for each test piece to begin to corrode on its coated surface was measured.

TABLE 2

| Sample | Coating composition | Coating thickness (μm) | Surface state | Corrosion resistance (hour) |
|---|---|---|---|---|
| Comparative Example 2 | D-1F | 15 | good | 500 |
| Comparative Example 3 | D-1F | 30 | cracked | 100> |
| Example 6 | Composition of Example 5 | 30 | good | 1,000 |
| Example 7 | Composition of Example 5 | 40 | good | 1,700 |

*D-1F: PTFE dispersion (water: 34 wt %, surfactant: 6 wt %, PTFE: 60 wt %, average particle diameter: 0.2 μm) produced by Daikin Industries.

EXAMPLE 8 AND COMPARATIVE EXAMPLE 4

Using an aluminum plate having a thickness of 2.5 mm ("ASB", manufactured by Kobe Steel, Ltd.) as an anode, electrochemical etching treatment of the aluminum plate was conducted in an aqueous solution of ammonium chloride at an electrical quantity of 25 C/cm$^2$ to finely roughen the surface of the plate.

The roughened aluminum plate surface was coated with a composition consisting of 38.6 wt % PTFE, 10.8 wt % PAI, 1.8 wt % mica, 0.1 wt % carbon, 6.0 wt % surfactant, and 52.7 wt % water. The coating was dried to remove the water and then baked at 400° C. for 30 minutes, thereby forming a resin layer having a thickness of 20 μm.

On this resin layer, each of the resin coating compositions as shown in Table 3 was coated. The coating was dried to remove the water and then baked at 390° C. for 30 minutes, thereby forming a second layer.

As shown in Table 3, the aluminum plate coated with the coating composition prepared in Example 5 showed extremely good corrosion resistance.

TABLE 3

| Sample | Coating composition | Second layer thickness (μm) | Surface state | Corrosion resistance (hour) |
|---|---|---|---|---|
| Comparative Example 4 | D-1F | 15 | good | 1,000 |
| Example 8 | Composition of Example 5 | 30 | good | 3,000 |

EXAMPLE 9

Using PFA particles having an average particle diameter of 20 μm ("MP-102", manufactured by du Pont) and PFA particles having an average particle diameter of 0.4 μm ("AD-2-CR", manufactured by Daikin Industries), coating compositions different in the proportion of the larger PFA particles to the smaller PFA particles were prepared, with the contents of the total fluororesin particles, a surfactant ("Octapol 80", manufactured by Sanyo Chemical), and water being fixed at 47 wt %, 6 wt %, and 47 wt %, respectively. These coating compositions were evaluated for dispersion stability (occurrence or nonoccurrence of irreversible agglomeration) and further examined for film-forming properties through single coating conducted at thicknesses of 30 μm and 40 μm. The results obtained are summarized in Table 4.

As Table 4 shows, it was found that the content of the smaller PFA particles in all PFA particles preferably is 20 wt % or more from the standpoint of dispersion stability and 80 wt % or less from the standpoint of film-forming properties.

TABLE 4

| Proportion of PFA particles | | Dispersion stability | Film-forming properties | |
|---|---|---|---|---|
| Diameter of 20 μm (wt %) | Diameter of 0.4 μm (wt %) | | Thickness of 30 μm | Thickness of 40 μm |
| 10 | 90 | A | C | C |
| 20 | 80 | A | B | B |
| 30 | 70 | A | B | B |
| 40 | 60 | A | A | B |
| 50 | 50 | A | A | B |
| 55 | 45 | A | A | A |
| 60 | 40 | A | A | A |
| 70 | 30 | A | A | A |
| 75 | 25 | A | A | A |
| 80 | 20 | B | A | A |
| 90 | 10 | C | A | A |
| 95 | 5 | C | A | A |
| 97 | 3 | C | A | A |
| 99 | 1 | C | A | A |

Evaluation

Dispersion stability:
A: Excellent (no irreversible agglomeration)
B: Good (somewhat tacky agglomerate, redispersion possible)
C: Poor (irreversible agglomeration)
Film-forming properties:
A: Excellent (no defects)
B: Good (small number of depression defects that can barely found with the naked eye)
C: Poor (many depression defects and cracks)

Further, a powder obtained by drying coating composition (a) (20 μm-PFA: 70 wt %, 0.4 μm-PFA: 30 wt %) and a sliced piece cut out of the agglomerate formed in coating composition (b) (20 μm-PFA: 90 wt %, 0.4 μm-PFA: 10 wt %) were examined with a scanning electron microscope.

As a result, the particles in the powder obtained from coating composition (a) were found to be in the form of composite particles in which each of the particles having an average particle diameter of 20 μm was surrounded with particles having an average particle diameter of 0.4 μm, as shown in FIG. 3.

In contrast, in the sliced piece obtained from coating composition (b), the particles having an average diameter of 20 μm had been bonded with one another through the surfactant, forming the macroagglomerate.

As described above, the fluororesin coating composition of the present invention can be coated on a wide variety of substrates including various metals, ceramics, glasses, fluororesin coating films, etc. at arbitrarily controlled coating film thicknesses in the range of from several micrometers to several tens of micrometers, thereby to give fluororesin coating films with the desired thicknesses without causing depression defects due to cissing and other defects. In addition, the coating composition has excellent stability. Therefore, the fluororesin coating composition of the present invention can be utilized in any of the fluororesin-coating applications such as, for example, topcoating of fixing rollers for copying machines and coating or topcoating for producing fluororesin-coated plates to be used in the manufacture of cooking utensils including rice cooker-warmers and frying pans.

While the invention has been described in detail and with reference to specific embodiments thereof, it will be apparent to one skilled in the art that various changes and modifications can be made therein without departing from the spirit and scope thereof.

What is claimed is:

1. A fluororesin coating composition comprising a liquid medium having dispersed therein (A) fluororesin having an average particle diameter of 5 μm or more and (B) fluororesin particles having an average particle diameter of 1 μm or less, the proportion of said fluororesin particles (B) based on the total amount of said fluororesin particles (A) and (B) being from 25 to 45% by weight.

2. A fluororesin coating composition as claimed in claim 1, wherein said fluororesin particles (A) and (B) each are spherical particles of a tetrafluoroethylene-perfluoro(alkyl vinyl ether) copolymer.

3. A fluororesin coating composition as claimed in claim 1, wherein said liquid medium comprises water and a nonionic surfactant.

4. A fluororesin coating composition as claimed in claim 1, wherein said fluororesin particles (A) are fluororesin particles having an average particle diameter of from 10 to 30 μm.

5. A fluororesin coating composition as claimed in claim 1, wherein said fluororesin particles (B) are fluororesin particles having an average particle diameter of 0.5 μm or less.

6. A fluororesin coating composition as claimed in claim 1, wherein said fluororesin particles (A) are spherical particles.

7. A fluororesin coating composition as claimed in claim 1, wherein said fluororesin particles (A) are for use in electrostatic coating.

8. A fluororesin coating composition as claimed in claim 1, wherein said fluororesin particles (A) comprise a heat-fusible fluororesin.

9. A fluororesin coating composition as claimed in claim 1, wherein said fluororesin particles (A) comprise at least one fluororesin selected from the group consisting of a tetrafluoroethylene-perfluoro(alkyl vinyl ether) copolymer, a tetrafluoroethylene-hexafluoropropylene copolymer, a tetrafluoroethylene-ethylene copolymer and a polychlorotrifluoroethylene.

10. A fluororesin coating composition as claimed in claim 1, wherein said fluororesin particles (B) comprise the same fluororesin as said fluororesin particles (A).

11. A fluororesin coating composition as claimed in claim 1, wherein said fluororesin particles (B) are spherical particles.

12. A fluororesin coating composition as claimed in claim 1, wherein sad fluororesin particles (B) comprise a heat-fusible fluororesin.

13. A fluororesin coating composition as claimed in claim 1, wherein said fluororesin particles (B) comprise at least one fluororesin selected from the group consisting of a tetrafluoroethylene-perfluoro(alkyl vinyl ether) copolymer, a tetrafluoroethylene-hexafluoropropylene copolymer, a tetrafluoroethylene-ethylene copolymer and a polychlorotrifluoroethylene.

* * * * *